(12) United States Patent
Bickham et al.

(10) Patent No.: US 6,959,135 B1
(45) Date of Patent: Oct. 25, 2005

(54) SBS SUPPRESSED NONLINEAR OPTICAL FIBER

(75) Inventors: Scott R. Bickham, Corning, NY (US); Dmitri V. Kuksenkov, Painted Post, NY (US); Shenping Li, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/019,722

(22) Filed: Dec. 21, 2004

(51) Int. Cl.[7] ............................ G02B 6/00; G02B 6/02; G02B 6/10
(52) U.S. Cl. .................................. 385/123; 385/147
(58) Field of Search ............................... 385/123–127, 385/129, 141–142, 144, 146, 147; 65/385

(56) References Cited

U.S. PATENT DOCUMENTS

| | | | |
|---|---|---|---|
| 4,679,934 A * | 7/1987 | Ganguly et al. | 356/43 |
| 4,794,598 A * | 12/1988 | Desurvire et al. | 372/3 |
| 5,504,829 A | 4/1996 | Evans et al. | 385/123 |
| 5,933,553 A * | 8/1999 | Ziemann | 385/24 |
| 6,157,762 A | 12/2000 | Gabitov et al. | 385/123 |
| 6,233,387 B1 | 5/2001 | Berkey et al. | 385/123 |
| 6,347,174 B1 | 2/2002 | Onishi et al. | 385/122 |
| 6,400,879 B1 | 6/2002 | Hawk et al. | 385/124 |
| 6,647,193 B2 | 11/2003 | Krastev et al. | 385/127 |
| 6,661,958 B2 | 12/2003 | Hirano et al. | 385/127 |
| 6,766,087 B2 | 7/2004 | Hiroishi et al. | 385/122 |
| 2002/0081069 A1 * | 6/2002 | Yeniay et al. | 385/39 |
| 2004/0071419 A1 | 4/2004 | Berkey et al. | 385/123 |
| 2004/0218882 A1 * | 11/2004 | Bickham et al. | 385/127 |
| 2004/0247320 A1 * | 12/2004 | Bickham et al. | 398/71 |
| 2004/0252994 A1 * | 12/2004 | Bickham et al. | 398/26 |
| 2005/0025501 A1 * | 2/2005 | Bickham | 398/188 |

FOREIGN PATENT DOCUMENTS

| | | | | |
|---|---|---|---|---|
| JP | 3-10204 | 1/1991 | ............ | G02B 6/10 |
| WO | WO 2004/073184 | 8/2004 | | |
| WO | WO2004/109353 | 12/2004 | ............ | G02B 6/22 |

OTHER PUBLICATIONS

Hiroishi, et al., "Development of Highly Nonlinear Fibers for Optical Signal Processing", Furukawa Review, No. 23, 2003, pps. 21-25.

Bogatyrev, et al., "A Single-Mode Fiber with Chromatic Dispersion Varying Along the Length", Journal of Lightwave Technology, vol. 9, No. 5, May 1991, pps. 561-566.

Bubnov, et al., "On the Origin of Excess Loss in Highly $GeO_2$-Doped Single-Mode MCVD Fibers", IEEE Photonics Technology Letters, vol. 16, No. 8, Aug. 2004, pps. 1870-1872.

Shiraki, et al., "Suppression of stimulated Brillouin scattering in a fibre by changing the core radius", Electronics Letters, vol. 31, No. 8, Apr. 13, 1995, pps. 668-669.

Shiraki, et al., "SBS Threshold of a Fiber with a Brillouin Frequency Shift Distribution", Journal of Lightwave Technology, vol. 14, No. 1, Jan. 1996, pps. 50-57.

Yu, et al., "Analysis of Brillouin Frequency Shift and Longitudinal Acoustic Wave in a Silica Optical Fiber With a Triple-Layered Structure", Journal of Lightwave Technology, vol. 21, No. 8, Aug. 2003, pps. 1779-1786.

(Continued)

*Primary Examiner*—Akm Enayet Ullah
(74) *Attorney, Agent, or Firm*—Joseph M. Homa

(57) ABSTRACT

An optical waveguide fiber having a high threshold for stimulated Brillouin scattering is disclosed which is suitable as a nonlinear fiber. The optical fiber has a core with one or more core segments. The optical effective area at a wavelength of 1550 nm is less that 30 $\mu m^2$.

18 Claims, 8 Drawing Sheets

OTHER PUBLICATIONS

Ohashi, et al., *"Fibre Diameter Estimation Based On Guided Acoustic Wave Brillouin Scattering"*, Electronics Letters, vol. 28, No. 10, May 7, 1992, pps. 900-902.

Shiraki, et al., *"Performance of Strain-Free Stimulated Brillouin Scattering Suppression Fiber"*, Journal of Lightwave Technology, vol. 14, No. 4, Apr. 1996, pps. 549-554.

Ohashi, et al., *"Design of Strain-Free-Fiber with Nonuniform Dopant Concentration for Stimulated Brillouin Scattering Suppression"*, Journal of Lightwave Technology, vol. 11. No. 12, Dec. 1993, pps. 1941-1945.

Shibata, et al., *"Brillouin-Gain Spectra for Single-Mode Fibers Having Various Core/Cladding Material Compositions"*, Fourteenth European Conference on Optical Communications, Sep. 11, 1988-Sep. 15, 1988, vol. 1, pps 115-118.

Mao, et al., *Stimulated Brillouin Threshold Dependence on Fiber Type and Uniformity*, IEEE Photonics Technology Letters, vol. 4, No. 1, Jan. 1992, pps. 66-69.

Tsujikawa, et al., *"New SBS Suppression Fiber with Uniform Chromatic Dispersion to Enhance Four-Wave Mixing"*, IEEE Photonics Technology Letters, vol. 10, No. 8, Aug. 1998, pps. 1139-1141.

Li, et al., *"Broad-band Dynamic Dispersion Compensation in Nonlinear Fiber-Based Device"*, Journal of Lightwave Technology, vol. 22, No. 1, Jan. 2004, pps. 29-38.

Kuksenkov, et al., *"Simultaneous 2R regeneration and dynamic dispersion compensation at 40 Gb/s in a nonlinear fiber-based device"*, Optical Fiber Communications Conference, Mar. 23-28, 2003, PD5 1-3, vol. 3.

Akasaka, et al., *"PMD mitigation application of MZI-SOA based optical 2R regeneration in the receiver"*, found at http://sierra.ece.ecdavis.edu/documents/ 16_Zuqing_PMD_OFC0_2R_ver.5pdf on Feb. 15, 2005.

* cited by examiner

FIG. 9
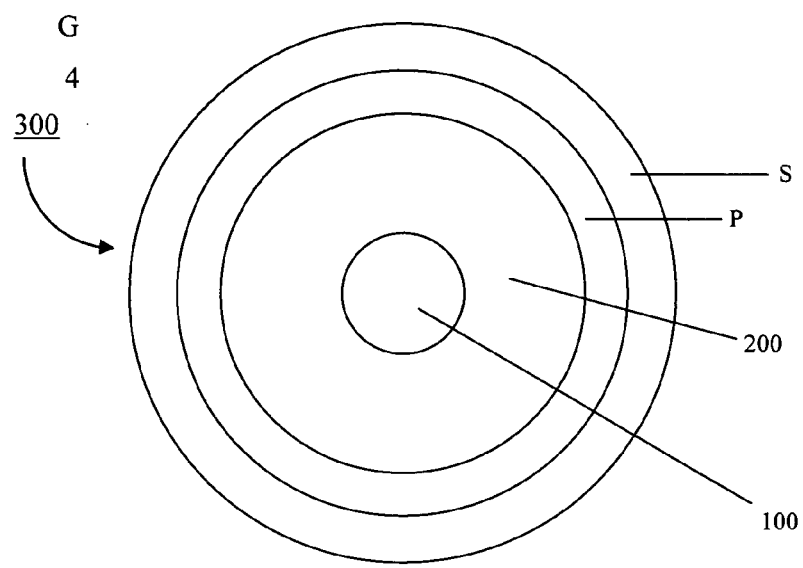
FIG. 10
FIG. 5
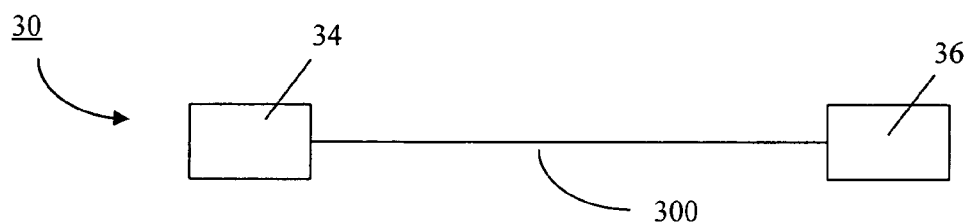

SBS SUPPRESSED NONLINEAR OPTICAL FIBER

BACKGROUND OF THE INVENTION

1 Field of the Invention

The present invention is directed generally to optical fiber for telecommunications and more specifically to Stimulated Brillouin scattering (SBS) suppressed optical fiber for nonlinear applications.

2 Technical Background

Stimulated Brillouin Scattering (SBS) is a dominant nonlinear penalty in many optical transmission systems. In many systems, the launching of large power to optical fiber while maintaining high signal to noise ratio (SNR) is desirable. However, as the launch power or signal power of an incident signal launched into an optical fiber increases, the launch power may exceed a certain threshold power and part of the signal power is reflected due to SBS as a reflected signal. An undesirably large amount of the signal power can thus be reflected back toward the transmitter due to SBS. In addition, the scattering process increases the noise level at the signal wavelength. The combination of decrease in signal power and increase in the noise both lower the SNR and lead to performance degradation.

Nonlinear applications utilizing known small effective area optical fibers are typically limited by the SBS threshold of the optical fiber. Typically the SBS limit is encountered before reaching the desired nonlinearities. Furthermore, known nonlinear fibers typically have a high dopant level in order to achieve a small effective area, but the high dopant level leads to increased losses due to Rayleigh scattering.

SUMMARY OF THE INVENTION

Disclosed herein is SBS-suppressed optical fiber suitable for nonlinear applications. With the optical fiber disclosed herein, it is possible to apply higher power and achieve more nonlinear behavior without reaching an SBS threshold, as compared to known fibers. Devices comprising the optical fiber disclosed herein thus are more efficient at achieving nonlinear effects than known devices.

The optical fiber comprises a core having a refractive index profile and a centerline and a cladding layer surrounding and directly adjacent the core. The core comprises one or more segments. The optical fiber has a mode field diameter at 1550 nm which is less than 7 $\mu$m, preferably less than 6 $\mu$m.

In some preferred embodiments, the core comprises a central core segment having a positive relative refractive index profile with a single peak relative refractive index. In other preferred embodiments, the core comprises a central core segment having a positive relative refractive index profile with first and second peaks in relative refractive index.

In some preferred embodiments, the cladding surrounds and is directly adjacent the central core segment. In other preferred embodiments, the core comprises a second core segment, i.e. an annular core segment, surrounding and directly adjacent the central core segment, wherein the annular core segment has a negative relative refractive index profile, and, preferably, the cladding surrounds and is directly adjacent the annular core segment.

In some preferred embodiments, the absolute magnitude of the dispersion at 1550 nm is less than 3 ps/nm-km. In other preferred embodiments, the absolute magnitude of the dispersion at 1550 nm is greater than 3 ps/nm-km, preferably greater than 6 ps/nm-km.

The optical fibers disclosed herein provide controllable dispersion. In some embodiments, dispersion is substantially constant at a given wavelength, such as at 1550 nm, which is achieved by a substantially constant core refractive index profile, a substantially constant core diameter, a substantially constant cladding refractive index profile, a substantially constant cladding diameter, along the length of the fiber. As used herein, a substantially constant diameter preferably varies by less than 2%, more preferably by less than 1%, for any corresponding diameter along the length of the fiber; for example, a substantially constant cladding diameter preferably varies by less than 2%, and more preferably varies by less than 1%, compared to any cladding diameter, i.e. the outermost glass diameter, along the length of the fiber. As used herein, a substantially constant dispersion preferably varies by less than 20%, more preferably less than 10%, and even more preferably less than 5%, over the length of the portion of fiber of interest. In other embodiments, dispersion varies at a given wavelength, such as at 1550 nm, which is achieved by a constant cladding refractive index profile, a variable cladding diameter, and a substantially constant core to clad ratio, along the length of the fiber.

Reference will now be made in detail to the present preferred embodiments of the invention, examples of which are illustrated in the accompanying drawings.

BRIEF DESCRIPTION OF THE DRAWINGS

FIG. 9 is a schematic cross-sectional view of a preferred embodiment of an optical waveguide fiber as disclosed herein.

FIG. 10 is a schematic view of a fiber optic communication system employing an optical fiber as disclosed herein.

DETAILED DESCRIPTION OF THE PREFERRED EMBODIMENT

Figure 1:
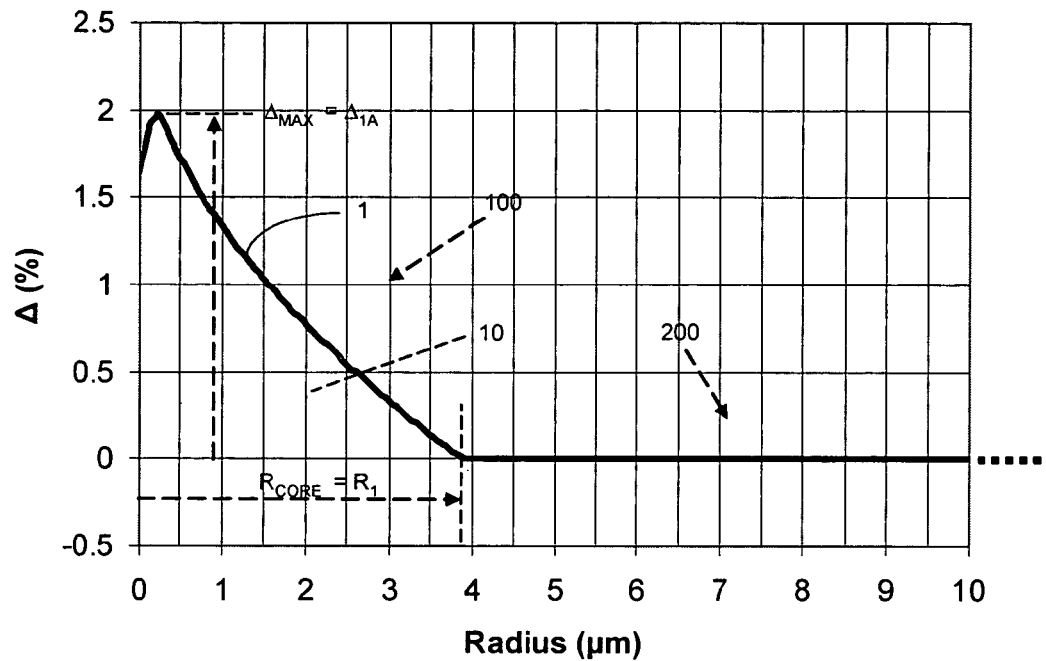
FIGS. 1–4 show refractive index profiles corresponding to a first set of preferred embodiments of an optical waveguide fiber as disclosed herein.
Figure 2:
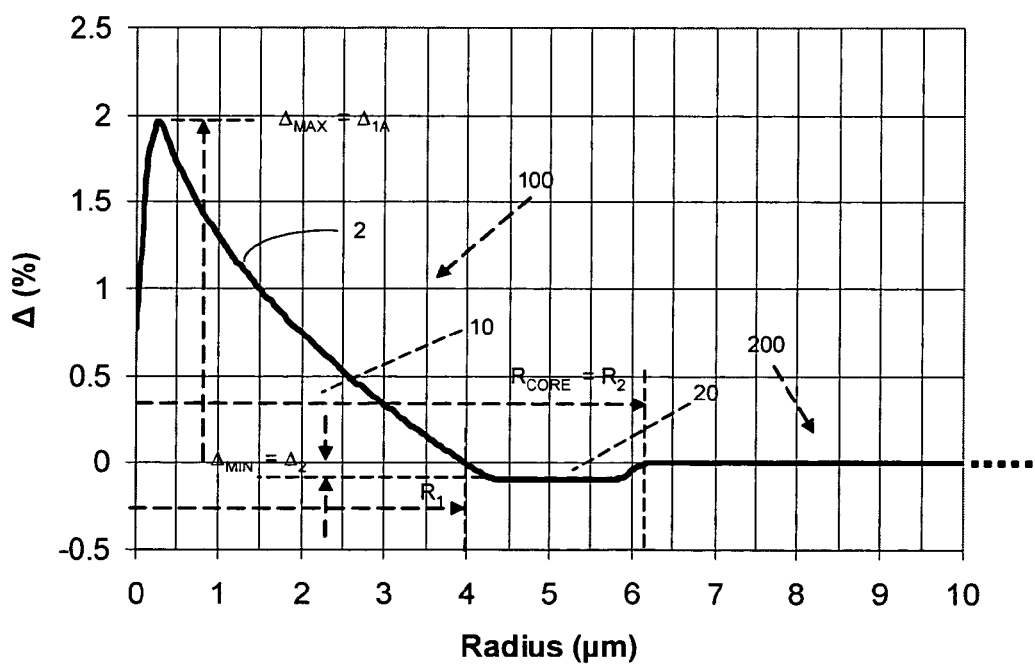
Figure 3:
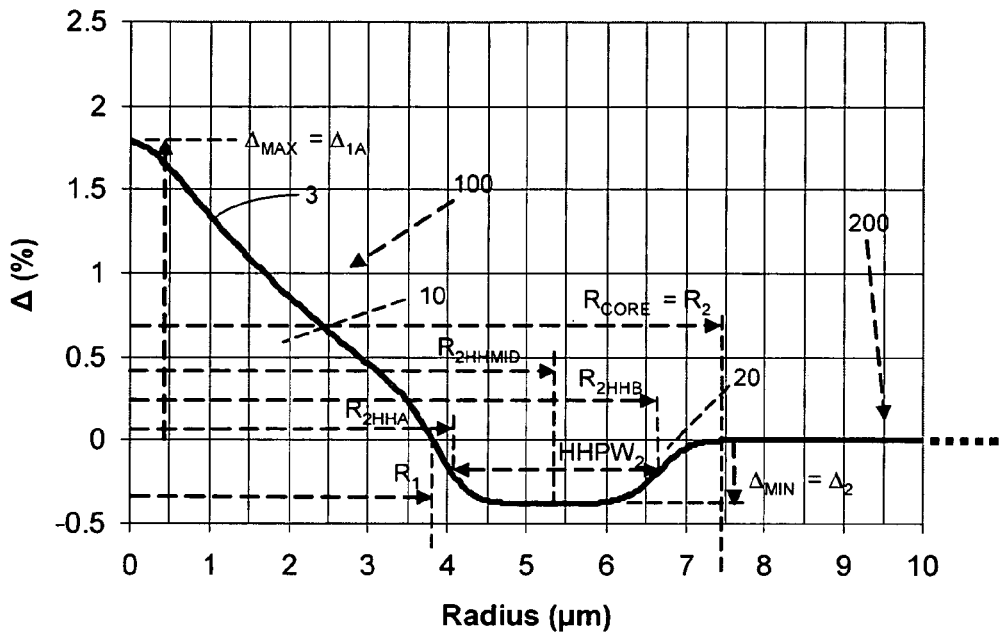
Figure 4:
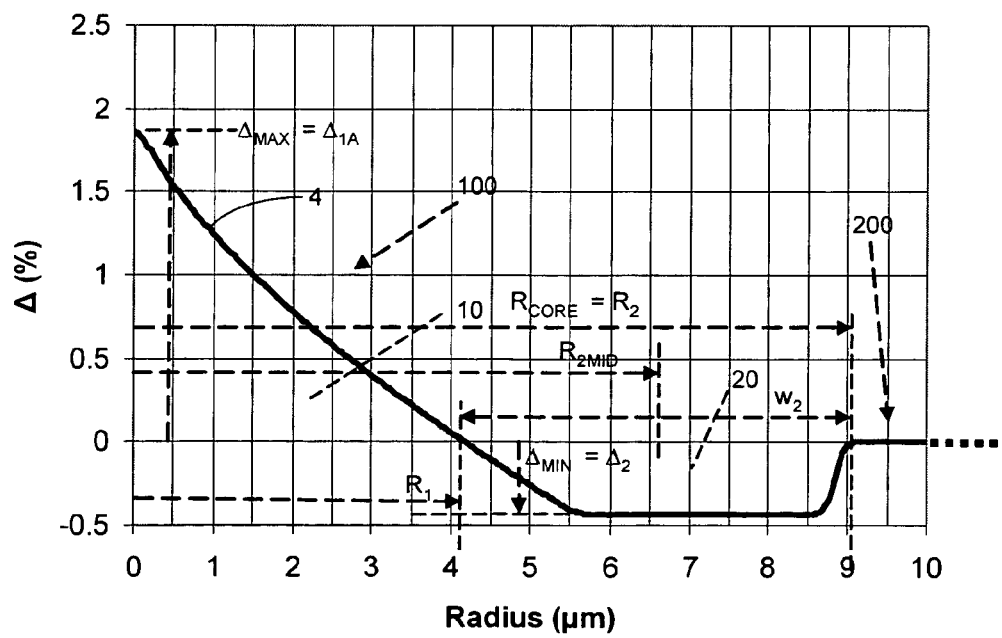
Figure 5:
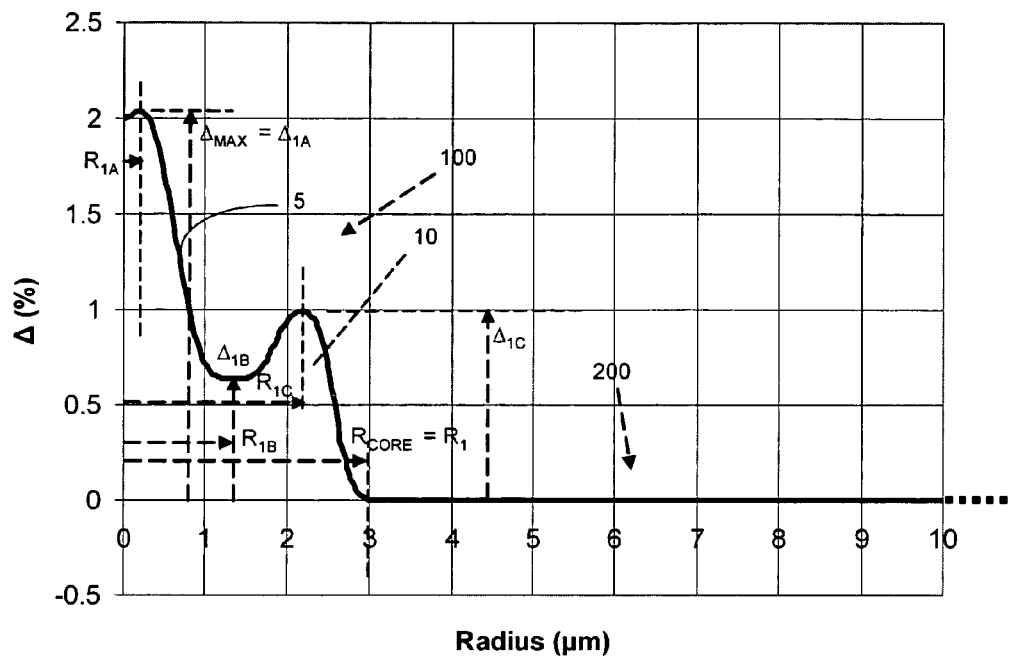
FIGS. 5–8 show refractive index profiles corresponding to a second set of preferred embodiments of an optical waveguide fiber as disclosed herein.
Figure 6:
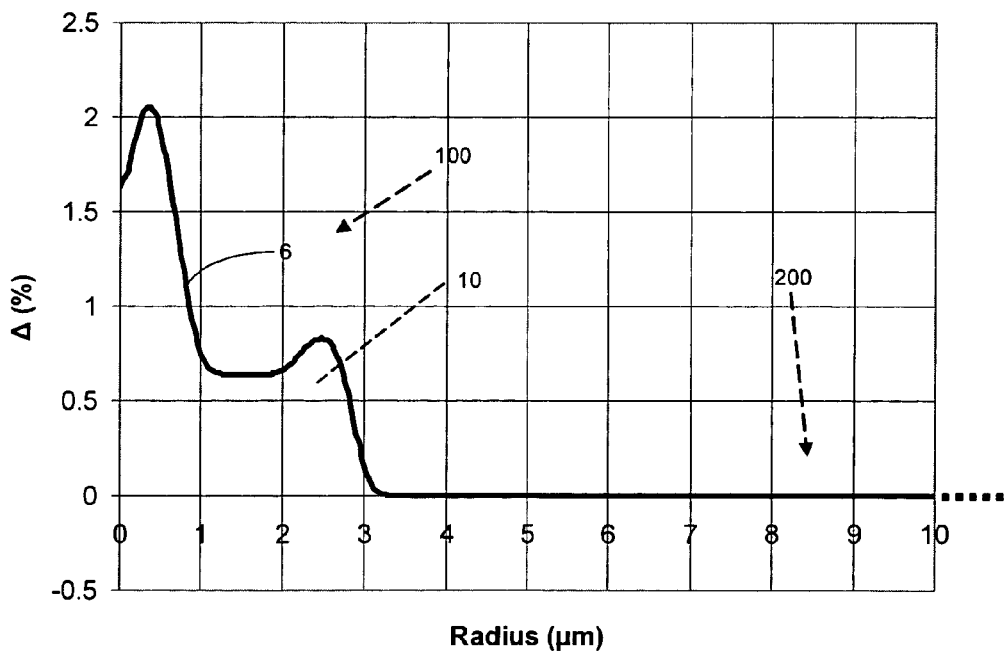
Figure 7:
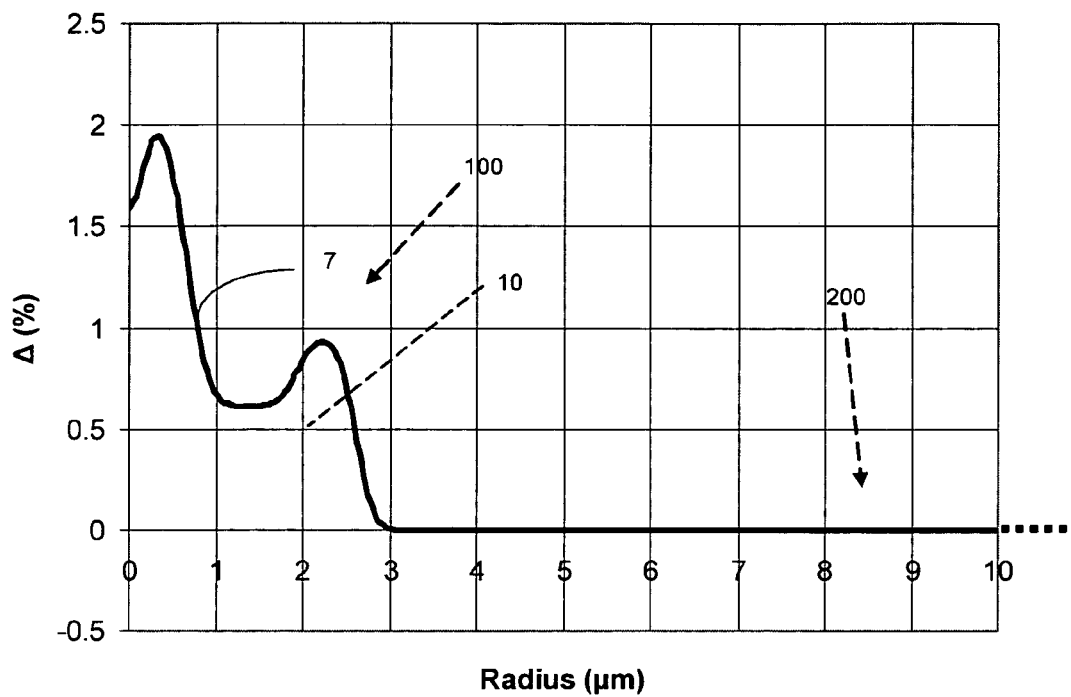
Figure 8:
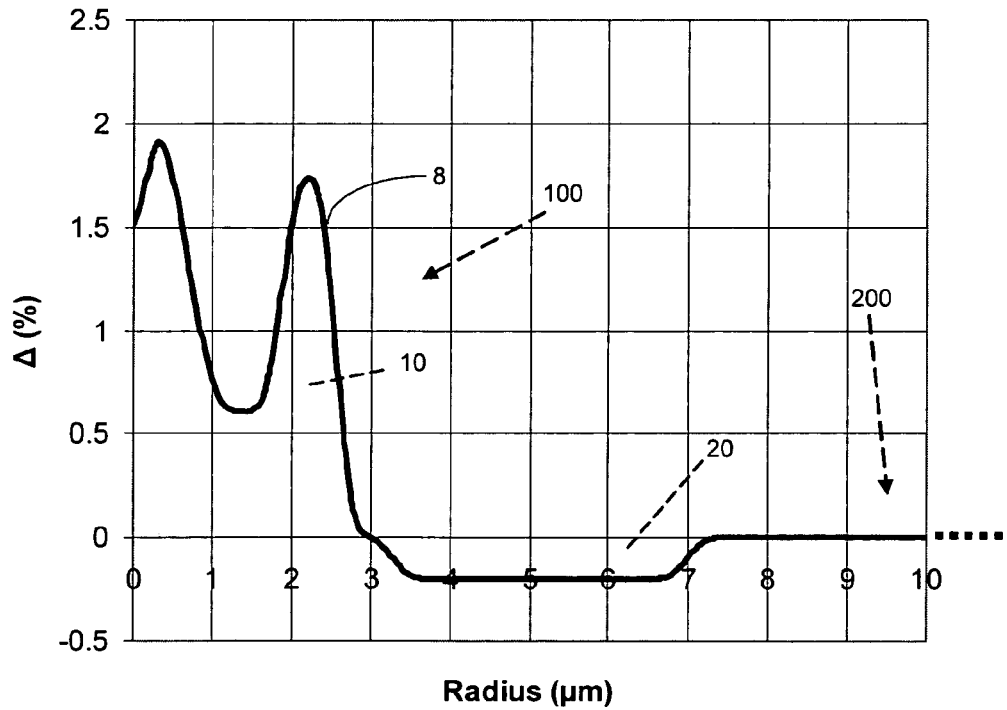

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\%=100\times(n_i^2-n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

Effective area is defined as [G. P. Agrawal, Nonlinear Fiber Optics, 3d edition, Academic Press, 2001, p. 44]

$$A_{\mathit{eff}} = \frac{2\pi\left(\int\int f_o^2 r dr\right)^2}{\int\int f_o^4 r dr},$$

where the integration limits are 0 to $\infty$ for the radial direction r, and $f_o$ is the optical field associated with light propagated in the waveguide. As used herein, "effective area" or "$A_{\mathit{eff}}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $\Delta(r)=\Delta(r_o)(1-[|r-r_o|/(r_1-r_o)]^\alpha)$, where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2=(2\int f_o^2 r\, dr/\int [df_o/dr]^2\, r\, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff" or "fiber cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance- Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode.

Kappa is the ratio of dispersion divided by dispersion slope at a particular wavelength. Unless otherwise noted herein, kappa is reported at a wavelength of 1550 nm.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical wave propagates in an optical waveguide in which acoustic modes are present, the frequency of the scattered light is determined by phase and wave-vector matching conditions:

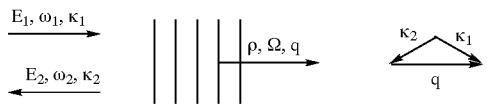

where $E_1$ and $E_2$ are electrical fields of the incident and reflected optical waves, respectively, $\omega_1$ and $\omega_2$ are the respective frequencies, $\kappa_1$ and $\kappa_2$ are the respective optic wave vectors, $\rho$ is material density, $\Omega$ is acoustic frequency, and q is acoustic wave vector.

The phase matching conditions are:

$$\omega_1 = \omega_2 + \Omega$$

$$q = \kappa_1 - \kappa_2$$

$$|q| = \kappa_1 + \kappa_2 \approx 2\theta_1$$

The Brillouin frequency is:

$$\Omega = |q|v$$

$$\Omega = 2nv\omega_1/c$$

The Brillouin frequency for bulk silica is around 11 GHz and v is velocity of sound.

The optical fields that contribute to the Brillouin scattering are:

$$E_1(z,t) = K_o f_o(r,\theta) A_1(z,t) \exp[i(\kappa_1 z - \omega_1 t)] + c.c. \quad \text{incident field}$$

$$E_2(z,t) = K_o f_o(r,\theta) A_2(z,t) \exp[i(\kappa_2 z - \omega_2 t)] + c.c. \quad \text{reflected field}$$

where $f_o(r, \theta)$ is the amplitude of the optical field at radius r and azimuthal angle $\theta$, $A_1$ and $A_2$ are the spatial and temporal evolution of the incident and reflection optical waves, respectively, and $K_o = [\int \int f_o^2(r,\theta) r dr d\theta]^{-1/2}$ is the normalization factor, and "c.c." denotes the complex conjugate of the first term.

The material density $\tilde{\rho}$ obeys the acoustic wave equation [R. W. Boyd, Nonlinear Optics, 2nd edition, Academic Press 2003, p. 418]:

$$\frac{\partial^2 \tilde{\rho}}{\partial t^2} - \Gamma' \nabla^2 \frac{\partial \tilde{\rho}}{\partial t} - v^2(r) \nabla^2 \tilde{\rho} = -\frac{\gamma_e \nabla^2 \langle E^2 \rangle}{8\pi}$$

where $\nabla^2$ is the Laplacian operator, $\Gamma'$ is the damping parameter, $\gamma_e$ is the electrostrictive constant, v is the velocity of sound, and $E = E_1 + E_2$.

The material density change can be represented as:

$$\tilde{\rho}(r, \theta, t, z) = \rho_0 + \sum_n a_n(z, t) f_a^{(n)}(r, \theta) \exp[i(q_n z - \Omega_n t)] + c.c.$$

where $\rho_0$ is the material density of silica. $f_a^{(n)}(r,\theta)$ is the transverse profile of the acoustic mode, which is the nth solution of the equation:

$$\nabla_\perp^2 - \left(\frac{\Omega^2}{v^2(r)} - q^2\right) \rho(r, \theta) = 0,$$

where $q_n$ and $\omega_n$, are the wave number and the acoustic frequency of the nth acoustic mode, respectively, and the coefficient $a_n(z,t)$ describes the spatial and temporal evolution of the nth acoustic mode.

The dependence of sound velocity on the transverse coordinate in the fiber v(r) is determined by the corresponding index profile $\Delta(r)$. The modal equation can be numerically solved by including the radial variation of the material density and longitudinal sound velocity across the refractive index profile:

$$v(r) = 5944[1 - 0.12 * \Delta(r)] \text{ [m/s]}$$

where numerical parameters in above equation were initially taken from N. Lagakos, J. A. Bucaro, and R. Hughes, Applied Optics, vol. 19, pp. 3668–3670 (1980) and adjusted to match the peaks in the measured Brillouin gain spectrum of LEAF optical fiber manufactured by Corning Incorporated [C.C. Lee and S. Chi, "Repeaterless Transmission of 80-Channel AM-SCM Signals over 100 km Large effective area dispersion-shifted fiber," IEEE Photonics Technology Lett. vol. 12, pp. 341–343 (February 2000)].

The above expansion can be substituted in the acoustic wave equation and the orthogonality condition used to obtain:

$$a_n \sim \frac{\iint f_o^2 f_a^{(n)} r dr d\theta}{\iint f_o^2 r dr d\theta \iint (f_a^{(n)})^2 r dr d\theta},$$

where the proportionality refers to the stationary coefficient of $a_n$ (z,t). Strictly speaking, the set of acoustic modes is complete but not orthogonal [see E. Peral and A. Yariv, IEEE J. Quantum Electronics, vol. 35, pp. 1185–1195 (1999)], but the assumption of orthogonality is supported by the good agreement between the predicted and measured SBS thresholds of the optical fibers disclosed herein.

The refractive index change caused by the acoustic field is proportional to the density change [R. W. Boyd, Nonlinear Optics, 2nd edition, Academic Press 2003, p. 404], i.e. $\Delta n \sim \tilde{\rho} - \rho_0$.

Therefore $\Delta n \sim \dfrac{\iint f_o^2 f_a^{(n)} r dr d\theta}{\iint f_o^2 r dr d\theta \iint (f_a^{(n)})^2 r dr d\theta} f_a^{(n)}$.

From the standard perturbation theory, the change in the propagation constant is [G. P. Agrawal, Nonlinear Fiber Optics, 3d edition, Academic Press, 2001, p. 43]:

$$\Delta\beta \sim \frac{\iint \Delta n f_o^2 r dr d\theta}{\iint f_o^2 r dr d\theta}$$

Then in analogy to the optical effective area, the acousto-optic effective area (AOEA) is introduced which depends on the overlap between the optical mode and the nth acoustic mode:

$$A_{\text{eff}}^{a-0,(n)} = \left[\frac{\iint f_o^2 r dr d\theta}{\iint f_o^2 f_a^{(n)} r dr d\theta}\right]^2 \iint (f_a^{(n)})^2 r dr d\theta$$

Since the imaginary part of $\Delta\beta$ represents the Brillouin gain, it is inversely proportional to the AOEA. Therefore, a small overlap between optical and acoustic fields leads to a large acousto-optic effective area and consequently small Brillouin gain for the respective acoustic mode.

For input signal at 1550 nm, values of the acousto-optic effective area of the optical fiber are calculated at the Brillouin frequency of the respective acoustic mode.

We have designed waveguides with robust optical properties and large acousto-optic effective areas. Measurements of a large number of fabricated optical fibers have verified the connection between acousto-optic effective area and the SBS gain factor.

The Brillouin frequency for optical fiber as disclosed herein is preferably between about 10 to 12 GHz.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$. The core has a maximum relative refractive index, AMAX, in %, occurring at a radius $R_{MAX}$. The core comprises one or more core segments: in some preferred embodiments, the core comprises only a single segment, i.e. a central core segment, and the cladding is directly adjacent the central core segment; in other preferred embodiments, the core comprises more than one segment, wherein one or more annular core segments surround the central core segment. The central core segment is defined herein to extend from the centerline (radius=0) to a radius $R_1$. A second segment is defined herein to extend from $R_1$ to a radius $R_2$, and so forth.

The optical fiber disclosed herein preferably comprises a central core segment having a positive relative refractive index profile. In some preferred embodiments, the core further comprises a second segment, i.e. an annular segment, preferably directly adjacent the central core segment. The second segment preferably has a negative relative refractive index, wherein $R_1$ is defined to occur where the relative refractive index profile passes through $\Delta=0\%$, and the second segment extends from $R_1$ to a radius $R_2$. For the embodiments disclosed herein, the core is defined herein to end at a radius $R_{CORE}$, and the cladding to begin, where the absolute magnitude of the relative refractive index of the core profile reaches 0.02% at radii greater than 3 μm, and, after reaching 0.02%, remains less than 0.02%. For example, for embodiments with only a single core segment, $R_1$ is defined to occur at the radius where the absolute magnitude of the relative refractive index of the central core segment becomes less than 0.02%; for embodiments with two core segments, $R_2$ is defined to occur at the radius where the absolute magnitude of the relative refractive index of the second core segment becomes less than 0.02%; and so on.

In some preferred embodiments, the core is comprised of a plurality of core portions. Each core portion may have a maximum relative refractive index for that core portion, i.e. a local maximum, reported in %, for example $\Delta_{1A}$ for a first core portion at a radius $R_{1A}$, $\Delta_{1B}$ for a second portion, and so on. Likewise, a core portion may have a minimum relative refractive index, such as $\Delta_2$. A maximum or minimum relative refractive index may occur at a particular radius, such as $R_{1A}$ or $R_{2A}$ and so on.

In particularly preferred embodiments, the optical fiber disclosed herein comprises a central core segment comprising a positive relative refractive index profile having a $\Delta_{MAX}$, of between 1.5 and 2.5%, preferably between 1.7 and 2.2%, more preferably between 1.8% and 2.1%, with $R_{MAX}$ between 0.0 and 0.5 μm, preferably between 0.0 and 0.4 μm. R1 is preferably between 2.5 and 5.0 μm, more preferably between 3.0 and 3.5 μm. Some of these embodiments further comprise an annular segment surrounding and directly adjacent the central core segment, the annular segment comprising a negative relative refractive index profile having a minimum $\Delta_2$, preferably between −0.05% and −0.5%, more preferably between −0.1% and −0.45%, , and preferably having an R2 of between 5 and 11 μm, more preferably between 6 and 10 μm. $\Delta_2$ is preferably the minimum relative refractive index value for the entire fiber, $\Delta_{MIN}$ Some of the particularly preferred embodiments comprise a central core segment having at least first, second, and third core portions, wherein the second core portion surrounds the first core portion, and the third core portion surrounds the second core portion, and wherein the first core portion comprises a local peak in relative refractive index, $\Delta_{1A}$, the third core portion comprises a local peak, $\Delta_{1C}$, and the second core portion comprises a local minimum in relative refractive index, $\Delta_{1B}$, where $\Delta_{1A}>\Delta_{1B}$ and $\Delta_{1C}>\Delta_{1B}$. Preferably $\Delta_{1A}>\Delta_{1B}$. Most preferably, $\Delta_{MAX}=\Delta_{1A}$. In some preferred embodiments, $\Delta_{1A}$ occurs at a radius $R_{1A}$ between the centerline (r=0) and 0.4 μm, $\Delta_{1C}$ occurs at a radius $R_{1C}$ between 1.5 and 3.0 μm, preferably between 2.0 and 2.6, and $\Delta_{1B}$ occurs at a radius RIB between $R_{1A}$ and $R_{1C}$; preferably RIB occurs between 1.2 and 1.7 μm.

In some preferred embodiments, the optical fiber disclosed herein can be referred to as dispersion shifted fiber with a zero dispersion wavelength in the vicinity of 1550 nm, wherein the absolute magnitude of the dispersion at 1550 nm is less than 3 ps/nm-km. In other preferred embodiments, the optical fiber disclosed herein can be referred to as non-zero dispersion shifted fiber with a zero dispersion wavelength outside the vicinity of 1550 nm, wherein the absolute magnitude of the dispersion at 1550 nm is greater than 3 ps/nm-km.

Zero dispersion sensitivity is defined herein as the ratio of the change in zero dispersion with change in the normalized ratio of $R_{CLAD}$, or $\delta\lambda_0/(\delta R_{CLAD}/R_{CLAD}*100\%)$, wherein $R_{CLAD}$ is the outer diameter of the cladding and wherein the ratio of $R_{CLAD}$ to the core radius, $R_{CORE}$, is substantially constant. Small variations in $R_{CLAD}$ during the manufacturing process can produce large variations in dispersion in fibers with large values of zero dispersion sensitivity, $\delta\lambda_0/(\delta R_{CLAD}/R_{CLAD}*100\%)$. Preferably, the optical fiber disclosed herein has $\delta\lambda_0(\delta R_{CLAD}/R_{CLAD}*100\%)$ less than 5 nm/%, more preferably less than 2 nm/%.

We have found that a higher dopant concentration at or near the optical fiber centerline, and in particular in a central portion of the core of the optical fiber, forces the acoustic modes to be more tightly confined.

Preferably, the core is comprised of doped silica, wherein the central segment is comprised of silica doped with germanium, i.e. germania doped silica. Doping of the core, and in particular the central portion of the core, advantageously reduces sound velocity in the optical fiber core relative to its cladding, resulting in a weakly guiding acoustic waveguide in the doped core. Dopants other than germanium, singly or in combination, may be employed within the core, and particularly at or near the centerline, of the optical fiber disclosed herein to obtain the desired refractive index and density. In some preferred embodiments, the core of the optical fiber disclosed herein has a non-negative refractive index profile, i.e. non-negative from the centerline to the outer radius of the core, $R_{CORE}$, more preferably a positive refractive index profile, wherein the core is surrounded by and directly adjacent to a cladding layer. In some preferred embodiments, the optical fiber contains no index-decreasing dopants in the core. In other preferred embodiments, the optical fiber contains both one or more index-increasing dopants and one or more index-decreasing dopants in the core.

The optical fiber disclosed herein has a MFD at 1550 nm less than 7 μm, preferably less than 6.5 μm, more preferably less than 6.0 μm; the fiber cutoff is less than 1450 μm; the fiber is single-moded at 1550 nm, preferably single-moded at wavelengths between 1530 and 1570 nm; the (optical) effective area at 1550 nm is less than 30 μm²; and the dispersion slope is less than 0.09 ps/nm²/km, preferably less than 0.08 ps/nm²/km, in some preferred embodiments less than 0.07 ps/nm²/km, and in other preferred embodiments less than 0.06 ps/nm²/km.

Preferably, the optical fiber disclosed herein has a cabled cutoff of less than 1400 nm, more preferably less than 1300 nm.

Preferably, the optical fiber disclosed herein is capable of transmitting optical signals in the 1260 nm to 1625 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used, either alone or in combination with any other deposition process. Thus, the refractive indices and the cross sectional profile of the optical waveguide fibers disclosed herein can be accomplished using manufacturing techniques known to those skilled in the art including, but in no way limited to, OVD, VAD and MCVD processes.

FIG. 9 is a schematic representation (not to scale) of an optical waveguide fiber 300 as disclosed herein having core 100 and an outer annular cladding or outer cladding layer or clad layer 200 directly adjacent and surrounding the core 100.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

$1^{st}$ Set of Preferred Embodiments

TABLE 1

| Example: | | Ex 1 | Ex 2 | Ex 3 | Ex 4 |
| --- | --- | --- | --- | --- | --- |
| Dispersion at 1525 nm | ps/nm-km | −2.8 | 7.0 | −1.8 | 5.4 |
| Dispersion at 1550 nm | ps/nm-km | −1.2 | 8.7 | −0.2 | 7.3 |
| Dispersion at 1575 nm | ps/nm-km | 0.4 | 10.3 | 1.4 | 9.0 |
| Dispersion at 1600 nm | ps/nm-km | 1.9 | 11.9 | 3.0 | 10.7 |
| Dispersion at 1625 nm | ps/nm-km | 3.4 | 13.4 | 4.5 | 12.4 |
| Dispersion Slope at 1550 nm | ps/nm²-km | 0.064 | 0.066 | 0.065 | 0.072 |
| Kappa at 1550 nm | nm | −19 | 132 | −3 | 101 |

TABLE 1-continued

| Example: | | Ex 1 | Ex 2 | Ex 3 | Ex 4 |
|---|---|---|---|---|---|
| Pin Array at 1550 nm | dB | $10^{-12}$ | $10^{-11}$ | $10^{-13}$ | $10^{-10}$ |
| Lateral Load at 1550 nm | dB | $10^{-12}$ | $10^{-11}$ | $10^{-13}$ | $10^{-11}$ |
| MFD at 1550 | $\mu m^2$ | 5.40 | 5.44 | 5.42 | 5.63 |
| $A_{eff}$ at 1550 nm | $\mu m^2$ | 21.6 | 22.3 | 22.1 | 23.7 |
| $AOEA_{L01}$ | $\mu m^2$ | 52 | 51 | 43 | 66 |
| $AOEA_{L02}$ | $\mu m^2$ | 61 | 70 | 75 | 71 |
| Attenuation at 1550 nm | dB/km | 0.213 | 0.210 | 0.214 | 0.207 |
| LP11 cutoff (theoretical) | nm | 1440 | 1402 | 1374 | 1358 |
| LP02 cutoff (theoretical) | nm | 1097 | 979 | 997 | 966 |
| Zero Dispersion Wavelength | nm | 1568 | 1432 | 1553 | 1456 |
| Zero Dispersion Sensitivity | nm/% | 4.95 | 1.40 | 4.3 | 1.20 |
| Fiber Cutoff | nm | <1450 | <1450 | <1450 | <1450 |
| Cabled Cutoff | nm | <1400 | <1400 | <1400 | <1400 |
| $\Delta(r = 0)$ | % | 1.65 | 0.77 | 1.79 | 1.87 |
| $\Delta(r = 1.0\ \mu m)$ | % | 1.33 | 1.30 | 1.34 | 1.24 |
| $\Delta(r = 1.5\ \mu m)$ | % | 1.03 | 1.00 | 1.09 | 1.00 |
| $\Delta(r = 2.0\ \mu m)$ | % | 0.78 | 0.75 | 0.86 | 0.78 |
| $\Delta(r = 2.5\ \mu m)$ | % | 0.55 | 0.53 | 0.65 | 0.58 |
| $\Delta(r = 3.0\ \mu m)$ | % | 0.34 | 0.33 | 0.46 | 0.40 |
| $\Delta(r = 4.0\ \mu m)$ | % | 0.00 | -0.01 | -0.15 | 0.06 |
| $\Delta(r = 5.0\ \mu m)$ | % | 0.00 | -0.10 | -0.38 | -0.26 |
| $\Delta(r = 6.0\ \mu m)$ | % | 0.00 | -0.04 | -0.37 | -0.43 |
| $\Delta(r = 7.0\ \mu m)$ | % | 0.00 | 0.00 | -0.05 | -0.43 |
| $\Delta(r = 8.0\ \mu m)$ | % | 0.00 | 0.00 | 0.00 | -0.43 |
| $\Delta(r = 9.0\ \mu m)$ | % | 0.00 | 0.00 | 0.00 | -0.02 |
| $\Delta(r = 10.0\ \mu m)$ | % | 0.00 | 0.00 | 0.00 | 0.00 |
| $\Delta_{1A}$ | % | 1.97 | 1.96 | 1.79 | 1.87 |
| $R_{1A}$ | $\mu m$ | 0.2 | 0.3 | 0.0 | 0.0 |
| $\Delta_{MAX}$ | % | 1.97 | 1.96 | 1.79 | 1.87 |
| $R_{MAX}$ | $\mu m$ | 0.2 | 0.3 | 0.0 | 0.0 |
| $R_1$ | $\mu m$ | 3.9 | 4.0 | 3.8 | 4.2 |
| $\alpha_1$ | — | 0.57 | 0.62 | 0.46 | 1.4 |
| $\Delta_2$ | % | — | -0.10 | -0.38 | -0.43 |
| $R_2$ | $\mu m$ | — | 6.1 | 7.2 | 9 |
| $W_2$ | $\mu m$ | — | 2.1 | 3.4 | 4.8 |
| $R_{2MID}$ | $\mu m$ | — | 5.1 | 5.5 | 6.6 |
| $R_{2HHA}$ | $\mu m$ | — | 4.2 | 4.1 | 4.9 |
| $R_{2HHB}$ | $\mu m$ | — | 6 | 6.7 | 8.8 |
| HHW2 | $\mu m$ | — | 1.8 | 2.6 | 3.9 |
| $R_{2HHMID}$ | $\mu m$ | — | 5.1 | 5.4 | 6.85 |

The optical fibers illustrated by Examples 1–4 have a peak $\Delta_{1A}$, which is equal to $\Delta_{MAX}$, between 1.7 and 2.1%. The relative refractive index profile of the central core segment preferably decreases monotonically with increasing radius after reaching $\Delta_{MAX}$. $R_1$ is preferably between 3.7 and 4.3 $\mu m$.

In some preferred embodiments, such as Example 1, the core has an entirely positive refractive index.

In other preferred embodiments, such as Examples 2–4, the core comprises an annular segment, surrounding and directly adjacent the central core segment, and having a $\Delta_2$ of between -0.05 and -0.5%, preferably between -0.1 and -0.45%. The annular segment preferably has a width $W_2$ between 2.0 and 5.0 $\mu m$ and a midpoint $R_{2MID}$ between 5.0 and 7.0 $\mu m$. Preferably, the inner radius of the half peak height of the annular segment, $R_{2HHA}$, is between 4.0 and 5.0 $\mu m$, the outer radius of the half peak height of the annular segment, $R_{2HHB}$, is between 6.0 and 9.0 $\mu m$, the half height peak width HHW2 is between 1.5 and 4.0 $\mu m$, and the midpoint of the half height peak width is between 5.0 and 7.0 $\mu m$.

Preferably, the optical fibers illustrated by Examples 1–4 have an LP11 cutoff (theoretical) of less than 1500 nm, and an LP02 cutoff (theoretical) of less than 1100 nm. Preferably, the attenuation at 1550 nm is less than 0.22 dB/km. Preferably, $AOEA_{L01}$ and $AOEA_{L02}$ are each greater than 40 $\mu m^2$.

In some preferred embodiments, such as in Examples 1 and 3, the absolute magnitude of the dispersion at 1550 nm is less than 3 ps/nm-km, and the fiber has a zero dispersion wavelength between 1500 and 1580 nm. In other preferred embodiments, such as in Examples 2 and 4, the absolute magnitude of the dispersion at 1550 nm is greater than 6 ps/nm-km, and the fiber has a zero dispersion wavelength less than 1500 nm.

Cladding 200, or a cladding layer, shown in FIG. 1 where $\Delta_{CLAD}=0$, surrounds and is directly adjacent the outer region of the core.

$2^{nd}$ Set of Preferred Embodiments

Table 2 lists an illustrative second set of preferred embodiments, Examples 5–8. FIGS. 5–8 show the corresponding refractive index profiles of Examples 5–8 in curves 5–8, respectively.

TABLE 2

| Example: | | Ex 5 | Ex 6 | Ex 7 | Ex 8 |
|---|---|---|---|---|---|
| Dispersion at 1525 nm | ps/nm-km | −0.6 | −2.8 | −1.4 | 12.1 |
| Dispersion at 1550 nm | ps/nm-km | 1.0 | −0.9 | 0.2 | 13.5 |
| Dispersion at 1575 nm | ps/nm-km | 2.52 | 0.9 | 1.7 | 14.8 |
| Dispersion at 1600 nm | ps/nm-km | 4.0 | 2.6 | 3.2 | 16.1 |
| Dispersion at 1625 nm | ps/nm-km | 5.4 | 4.2 | 4.6 | 17.3 |
| Dispersion Slope at 1550 nm | ps/nm²-km | 0.061 | 0.074 | 0.063 | 0.054 |
| Kappa at 1550 nm | nm | 16 | −12 | 3 | 250 |
| Pin Array at 1550 nm | dB | $10^{-7}$ | $10^{-7}$ | $10^{-6}$ | $10^{-10}$ |
| Lateral Load at 1550 nm | dB | $10^{-7}$ | $10^{-8}$ | $10^{-7}$ | $10^{-11}$ |
| MFD at 1550 | μm | 5.97 | 5.98 | 6.07 | 5.70 |
| $A_{eff}$ at 1550 nm | μm² | 26.9 | 26.9 | 27.7 | 26.9 |
| $AOEA_{L01}$ | μm² | 93 | 66 | 84 | 100 |
| $AOEA_{L02}$ | μm² | 93 | 57 | 96 | 106 |
| Attenuation at 1550 nm | dB/km | 0.219 | 0.218 | 0.219 | 0.259 |
| LP11 cutoff (theoretical) | nm | 1288 | 1327 | 1256 | 1434 |
| LP02 cutoff (theoretical) | nm | 968 | 1035 | 958 | 973 |
| Zero Dispersion Wavelength | nm | 1533 | 1563 | 1547 | 1352 |
| Zero Dispersion Sensitivity | nm/% | 4.4 | 2.13 | 4.63 | 1.63 |
| Fiber Cutoff | nm | <1450 | <1450 | <1450 | <1450 |
| Cabled Cutoff | nm | <1400 | <1400 | <1400 | <1400 |
| Δ(r = 0) | % | 2.00 | 1.63 | 1.59 | 1.52 |
| Δ(r = 1.0 μm) | % | 0.72 | 0.75 | 0.68 | 0.77 |
| Δ(r = 1.5 μm) | % | 0.64 | 0.64 | 0.61 | 0.61 |
| Δ(r = 2.0 μm) | % | 0.94 | 0.66 | 0.84 | 1.52 |
| Δ(r = 2.5 μm) | % | 0.71 | 0.83 | 0.71 | 1.15 |
| Δ(r = 3.0 μm) | % | 0.00 | 0.16 | 0.01 | 0.00 |
| Δ(r = 4.0 μm) | % | 0.00 | 0.00 | 0.00 | −0.20 |
| Δ(r = 5.0 μm) | % | 0.00 | 0.00 | 0.00 | −0.20 |
| Δ(r = 6.0 μm) | % | 0.00 | 0.00 | 0.00 | −0.20 |
| Δ(r = 7.0 μm) | % | 0.00 | 0.00 | 0.00 | −0.09 |
| Δ(r = 8.0 μm) | % | 0.00 | 0.00 | 0.00 | 0.00 |
| Δ(r = 9.0 μm) | % | 0.00 | 0.00 | 0.00 | 0.00 |
| Δ(r = 10.0 μm) | % | 0.00 | 0.00 | 0.00 | 0.00 |
| $Δ_{1A}$ | % | 2.04 | 2.06 | 1.95 | 1.91 |
| $R_{1A}$ | μm | 0.2 | 0.35 | 0.35 | 0.35 |
| $Δ_{1B}$ | % | 0.64 | 0.64 | 0.61 | 0.61 |
| $R_{1B}$ | μm | 1.35 | 1.55 | 1.4 | 1.4 |
| $Δ_{1C}$ | % | 0.99 | 0.83 | 0.93 | 1.73 |
| $R_{1C}$ | μm | 2.2 | 2.5 | 2.25 | 2.2 |
| $Δ_{MAX}$ | % | 2.04 | 2.06 | 1.95 | 1.91 |
| $R_{MAX}$ | μm | 0.2 | 0.35 | 0.35 | 0.35 |
| $R_1$ | μm | 3.0 | 3.2 | 3.0 | 3.0 |
| $α_1$ | — | 1.39 | 1.91 | 1.88 | 0.99 |
| $Δ_2$ | % | — | — | — | −0.20 |
| $R_2$ | μm | — | — | — | 7.2 |
| $W_2$ | μm | — | — | — | 4.2 |
| $R_{2MID}$ | μm | — | — | — | 5.1 |
| $R_{2HHA}$ | μm | — | — | — | 3.3 |
| $R_{2HHB}$ | μm | — | — | — | 7.0 |
| HHW2 | μm | — | — | — | 3.7 |
| $R_{2HHMID}$ | μm | — | — | — | 7.2 |

The optical fibers illustrated by Examples 5–8 have a peak $Δ_{1A}$, which is equal to $Δ_{MAX}$, between 1.8 and 2.1%. The relative refractive index profile of the central core segment decreases with increasing radius after reaching $Δ_{MAX}$, hitting a local minimum $Δ_{1B}$, then increases with increasing radius to a second peak, or local maximum, $Δ_{1C}$, before decreasing again toward $R_1$. $R_1$ is preferably between 2.5 and 3.5 μm, more preferably between 3.0 and 3.5 μm. $Δ_{1A}$ is preferably between 1.85 and 2.2%, more preferably between 1.9 and 2.1%. $Δ_{1C}$ is between 0.5 and 2%, preferably between 0.75 and 1.9%, more preferably between 0.8 and 1.8%; for embodiments such as Examples 5–7, $Δ_{1C}$ is between 0.5 and 1.5%, preferably between 0.75 and 1.1%, while for embodiments such as Example 8, $Δ_{1C}$ is between 1.5 and 2.0%, preferably between 1.6 and 1.9%. $R_{1C}$ is preferably between 2.1 and 2.6 μm, more preferably between 2.2 and 2.5 μm. $Δ_{1B}$ is between 0.5 and 1%, preferably between 0.5 and 0.7%, more preferably between 0.60 and 0.65%.

In some preferred embodiments, such as Examples 5–7, the core has an entirely positive refractive index.

In other preferred embodiments, such as Example 8, the core comprises an annular segment, surrounding and directly adjacent the central core segment, and having a $Δ_2$ of between −0.05 and −0.5%, preferably between −0.1 and −0.3%. The annular segment preferably has a width $W_2$ between 3 and 5 μm and a midpoint $R_{2MID}$ between 4 and 6 μm. Preferably, the inner radius of the half peak height of the annular segment, $R_{2HHA}$, is between 3.0 and 4.0 μm, the outer radius of the half peak height of the annular segment, $R_{2HHB}$, is between 6.0 and 8.0 μm, the half height peak width HHW2 is between 3 and 5 μm, and the midpoint of the half height peak width is between 4 and 6 μm.

Preferably, the optical fibers illustrated by Examples 5–8 have an LP11 cutoff (theoretical) of less than 1450 nm, and an LP02 cutoff (theoretical) of less than 1100 mm. Preferably, the attenuation at 1550 nm is less than 0.27 dB/km. Preferably, $AOEA_{L01}$ and $AOEA_{L02}$ are each greater than 40 $\mu m^2$, preferably each greater than 50 $\mu m^2$.

In some preferred embodiments, such as in Examples 5–7, the absolute magnitude of the dispersion at 1550 nm is less than 3 ps/nm-km, and the fiber has a zero dispersion wavelength between 1500 and 1580 nm. In other preferred embodiments, such as in Example 8, the absolute magnitude of the dispersion at 1550 nm is greater than 6 ps/nm-km, and the fiber has a zero dispersion wavelength less than 1500 nm.

Cladding 200, or a cladding layer, shown in the figures, where $\Delta_{CLAD}=0$, surrounds and is directly adjacent the outer region of the core.

As shown in FIG. 10, an optical fiber 300 as disclosed herein may be implemented in an optical fiber communication system 30. System 30 includes a transmitter 34 and a receiver 36, wherein optical fiber 300 allows transmission of an optical signal between transmitter 34 and receiver 36. System 30 is preferably capable of 2-way communication, and transmitter 34 and receiver 36 are shown for illustration only. The system 30 preferably includes a link which has a section or a span of optical fiber 300 as disclosed herein. The system 30 may also include one or more optical devices optically connected to one or more sections or spans of optical fiber 300 as disclosed herein, such as one or more regenerators, amplifiers, or dispersion compensating modules, and/or the system 30 may include one or more optical devices which also include an optical fiber 300 as disclosed herein.

The fibers disclosed herein exhibit low PMD values particulary when fabricated with OVD processes. Spinning of the optical fiber may also lower polarization mode dispersion (PMD) values for the fiber disclosed herein.

Brillouin scattering loss of the optical fiber disclosed herein, and in particular of Ge-doped optical fiber, may be further reduced by modulating the tension applied to the fiber during draw. At least a portion, preferably an end portion, of an optical fiber preform is heated to a high temperature so that an optical fiber can be drawn, such as by lowering the preform into an RF induction furnace and heating it to a melting temperature, the preform comprising a high purity, low loss germanium silicate glass core surrounded by an outer layer of glass cladding with a lower index of refraction than the core. Fiber is then drawn from the heated preform at an appropriately modulated tension. Upon sufficient heating, a melted end portion of the preform bearing a glass strand drops, and the strand is inserted into a fiber drawing station. The parameters are then adjusted to produce a fiber of desired diameter and uniformity. The fiber drawing speed and tension can be under control of a computer. The draw tension on the fiber is modulated with respect to fiber length in a sinusoidal, triangular or, preferably, a trapezoidal waveform essentially between a minimum in the range 10 to 50 g and a maximum in the range 150 to 250 g. The sinusiodal waveform is actually the positive half of a true sinusoid, and its wavelength as referred to herein is the length from the minimum tension range to the maximum back to the minimum. The preferred wavelength of a sinusoidal is in the range 3 to 30 km. The preferred triangular waveform is characterized by a base along the length in the range 3 to 30 km; and the preferred trapezoidal waveform has a pair of bases along the fiber length: a major base in the range 3 km to 15 km and a minor base in the range 1 km to 13 km. The resulting product is drawn optical fiber having a Ge-doped core and a cladding surrounding the core. The core is characterized by a repeated pattern of modulated strain. The strain is modulated with length between a low produced by 10–50 g of stress in the draw to a high produced by 150–250 g stress in the draw. The modulation pattern is characterized by a repetition length in the range 3 to 30 km. The pattern waveform is preferably sinusoidal, triangular or trapezoidal. Also see U.S. Pat. No. 5,851,259, which is incorporated herein by reference in its entirety.

Stimulated Brillouin scattering (SBS) can be measured by a measurement system that records input power ($P_{in}$) and backscattered power ($P_{bs}$) as input power is varied over a defined range of input powers. Various systems and/or methods of determining the SBS threshold of an optical fiber could be used to characterize the fiber. One preferred method and system are disclosed herein.

Figure 11:
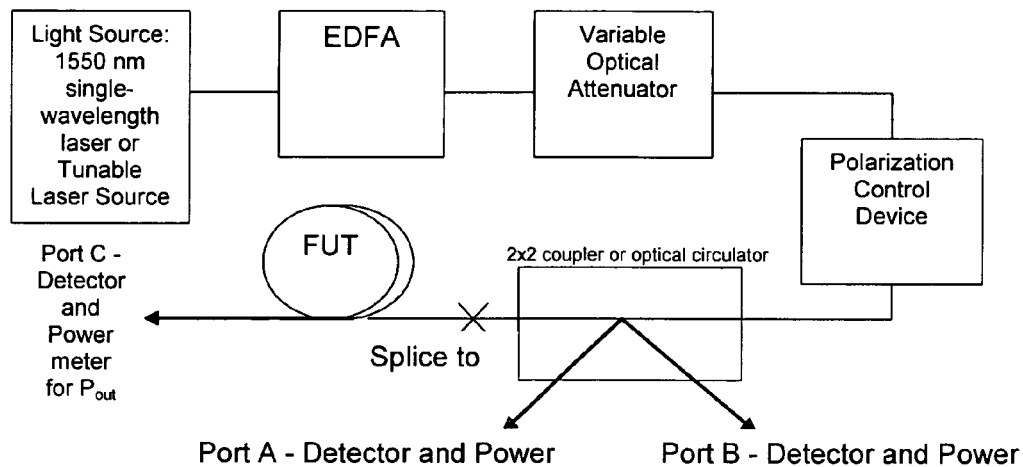
FIG. 11 is a schematic of a representative measurement system for measuring SBS threshold.

The measurement system disclosed herein comprises a light source, an erbium-doped fiber amplifier (EDFA), a variable optical attenuator (VOA), a polarization controller, an optical power routing device such as a two-by-two coupler or an optical circulator, and several optical power detectors and power meters. Single-mode patchcords with FC/APC connectors join these components. A representative measurement system is shown in FIG. 11.

The light source, which may be a tunable or single-wavelength continuous wave laser, has a very narrow spectral width, about 150 kHz or less. The wavelength is preferably centered around 1550 nm, but can vary within the gain band of the EDFA. An EDFA is used to amplify the optical signal to power levels that can induce SBS in the fiber under test. A variable optical attenuator (VOA) is used to vary the optical power that is launched into the fiber under test. The VOA is selected to allow sufficiently fine step sizes and sufficient range to allow the measurement of input power and backscattered power across a broad range of input powers. A polarization control device is preferably used to establish 100% degree of polarization and a stable state of polarization. A two-by-two directional coupler or optical circulator directs power to the fiber under test and supports the monitoring of backscattered power (Port B) and/or input power (Port A). The fiber under test (FUT) is connected to the coupler or circulator with a fusion splice or other reflectionless connection device or method. A third detector may be used to monitor output power at Port C. Unless otherwise noted herein, SBS threshold values reported herein correspond to subjecting the optical fiber to the output of a continuous wave laser having a very narrow spectral width, about 150 kHz or less. Higher threshold values may be obtained for the same fiber when subjected to the output of sources having dithered or wider spectral widths. SBS threshold values reported herein correspond to optical fibers having a length of about 10 km, unless otherwise noted. It should be understood that the SBS threshold measurements could be performed on different lengths of fiber.

To conduct a measurement, a fiber is spliced into the system and the coupler taps are connected to the optical power detectors. The laser is activated and the EDFA yields a fixed output power. The VOA attenuation is stepped across a selected range in small increments, from a high inserted loss value to zero. For example, in one embodiment the step size is 0.1 dB and the scan range is 20 dB.

Reference measurement is conducted to obtain the actual input power. Although the input power is monitored during this process, the reference measurement allows a determination of actual input power without having to account for polarization dependent loss (PDL) and splice loss. This measurement is conducted on a two-meter sample of the fiber under test. The fiber is cutback and connected to Port C. The VOA scan is repeated over the same range, and the reference input power is recorded at Port C. These power values are used as the input powers of record. The input power and backscattered power level are recorded at each step (see curve P in FIG. 12).

Figure 12:
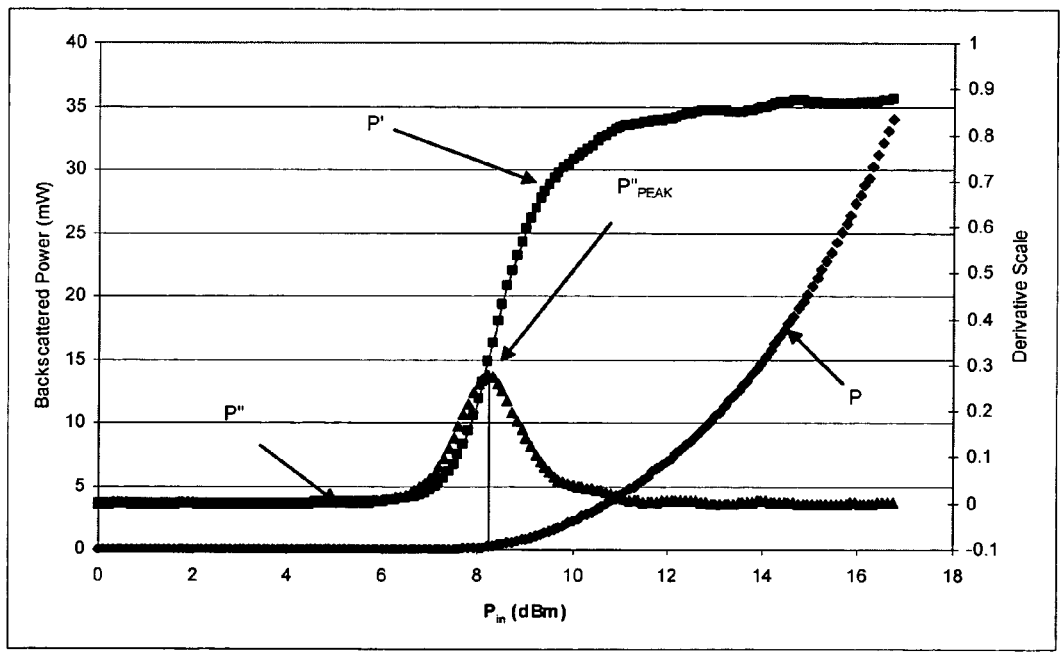
FIG. 12 is a plot of backscattered power versus input power, and its first and second derivatives for a representative optical fiber SBS threshold measurement.

When the scans are completed, first and second derivatives of the curve are calculated. The data set are preferably smoothed prior to calculating the first and second derivatives. The absolute SBS threshold is herein defined at the point at which the second derivative is maximum. An illustrative plot of measured data (curve P) and the first and second derivatives (curve P' and P'', respectively) are presented in FIG. 12. Curve P' is then the first derivative of backscattered power in mW with respect to input power in mW. Curve P'' is the second derivative of backscattered power in mW with respect to input power in mW. In FIG. 12, the abscissa of the peak $P''_{PEAK}$ of curve P'' is the absolute SBS threshold, SBSt, in dBm (e.g. 8.22 dBm in FIG. 12). That is, the input power at which the second derivative is a maximum is defined as the absolute SBS threshold for the fiber.

As reported herein, SBS threshold values were obtained with a polarization control device that establishes a fixed polarization state. However, in an alternate embodiment of the system and/or method for measuring SBS threshold, the SBS threshold could also be measured with a polarization randomizer or scrambler. The use of a polarization randomizer would increase the measured SBSt values for a given optical fiber by approximately a factor of 1.5 [see M. O. van Deventer and A. J. Boot, J. Lightwave Technology, vol. 12, pp. 585–590 (1994)] when compared to the SBSt value obtained with a fixed polarization state (100% degree of polarization and constant state of polarization).

Comparative SBS threshold values reported herein can be used to compare the SBS threshold of other fibers of the same length measured in the same way (i.e. by the same method, and measurement system if measurement data is used). Thus, even though various SBS threshold measurement methods (and systems) may exist, the comparative values obtained from two different fibers according to the same method should be substantially similar to comparative values obtained from those fibers utilizing a different method.

The SBS threshold varies with the length and attenuation of the fiber under test. Generally, a very short length of an optical fiber will tend to have a higher SBS threshold value than a very long length of the same fiber. Also, generally, a length of one optical fiber having a higher attenuation will tend to have a higher SBS threshold value than the same length of another similar optical fiber having a lower attenuation. An approximate analytical expression is given in "Raman and Brillouin Non-Linearities in Broadband WDM-Overlay Single Fiber PONs," G. H. BuAbbud et al., ECOC 2003:

$$P_{th}(L) \approx 21 \frac{\alpha A_{\textit{eff}}}{g_B^{\textit{eff}}[1-\exp(-\alpha L)]},$$

where $g_B^{\textit{eff}}$ is the effective Brillouin gain coefficient, α is the attenuation, L is the fiber length, $A_{\textit{eff}}$ is the optical effective area. In this simple approximation, the SBS threshold is inversely proportion to the effective length of the fiber. Thus, if the measured threshold for a length $L_1$ is $P_1$, then the threshold at length $L_2$ is $$P_2(dB) \cong P_1(dB) + 10 \log\left[\frac{1-\exp(-\alpha L_1)}{1-\exp(-\alpha L_2)}\right].$$

For example, the values of SBS threshold reported herein correspond to fibers having a length ($L_1$) of about 10 km and an attenuation at 1550 nm of about 0.50 dB/km. Thus, the SBS threshold, $P_{TH}=P_2$, for an optical fiber of the type disclosed herein having a length $L_2$ and attenuation $\alpha_2$ can be determined from:

$$PTH = P_2(dB) \cong P_1(dB) + 10 \log\left[\frac{1-\exp(-0.50*10.0)/4.343)}{1-\exp(-\alpha L_2)}\right].$$

Figure 13:
FIG. 13 is a representative graphic illustration of the dependence of SBS threshold with fiber length for a representative optical fiber with a given attenuation.

FIG. 13 is a graphic illustration of the dependence of SBS threshold with fiber length for a representative optical fiber with a given attenuation. Generally, for a fibers of substantially the same attenuation, the SBS threshold decreases with increasing length. For very long lengths (e.g. >1 km or >5 km etc.), the SBS threshold decreases asymptotically. At very small lengths, the SBS threshold can increase dramatically. If all else were equal, the SBS threshold is smaller for a lower attenuation fiber, although attenuation generally has a less pronounced, secondary effect on the SBS threshold as compared to fiber length. Thus, the above equation may be used as a lower limit on SBS threshold P2 for fibers of having lengths $L_2$ greater than 10.0 km and attenuation less than 0.50 dB/km, where the SBS threshold P1 of a reference fiber having length 10 km and attenuation 0.50 dB/km is determined.

Preferably, the optical fiber disclosed herein has a silica-based core and cladding. In preferred embodiments, the cladding has an outer diameter of about 125 μm. In some preferred embodiments, the outer diameter of the cladding has a constant diameter along the length of the optical fiber. In preferred embodiments, the refractive index of the optical fiber has radial symmetry.

Table 3 lists the characteristics of three sample optical fibers as disclosed herein, Examples 9, 10 and 11, made via an outside vapor deposition (OVD) process. The relative refractive index profiles of Examples 9–11 were substantially similar to the profiles described above in Examples 4, 7, and 8, respectively.

TABLE 3

| Example: | | Ex 9 | Ex 10 | Ex 11 |
|---|---|---|---|---|
| Length | km | 10 | 10 | 13 |
| Glass Diameter (=2*$R_{CLAD}$) | μm | 125 | 125 | 110–134 |
| Attenuation at 1550 nm | dB/km | 0.381 | 0.428 | 0.458 |
| 2m Fiber Cutoff Wavelength | nm | 1488 | 1588 | 1560 |
| MFD at 1550 nm | μm | 4.98 | 5.16 | 5.93 |
| $A_{\text{eff}}$ at 1550 nm | μm² | 19.45 | 20.9 | 27.6 |
| Zero Dispersion Wavelength | nm | 1463 | 1554 | 1217 |
| Dispersion at 1525 nm | ps/nm-km | 4.0 | −1.9 | 10.3 |
| Dispersion at 1550 nm | ps/nm-km | 5.7 | −0.3 | 11.6 |

TABLE 3-continued

| Example: | | Ex 9 | Ex 10 | Ex 11 |
|---|---|---|---|---|
| Dispersion at 1575 nm | ps/nm-km | 7.4 | 1.3 | 12.9 |
| Dispersion at 1600 nm | ps/nm-km | 8.9 | 2.7 | 14.0 |
| Dispersion at 1625 nm | ps/nm-km | 10.2 | 4.3 | 15.2 |
| Dispersion Slope at 1550 nm | ps/nm$^2$-km | 0.065 | 0.064 | 0.05 |
| Dispersion Slope at 1600 nm | ps/nm$^2$-km | 0.06 | 0.058 | 0.045 |
| Kappa at 1550 nm | nm | 87 | −4.9 | 233 |
| Kappa at 1600 nm | nm | 148 | 47 | 309 |
| PMD | ps/sqrt(km) | 0.04 | — | 0.02 |

The glass diameter of Examples 9 and 10 were substantially constant at about 125 µm, and did not vary outside of the range 124 to 126 µm. The glass diameter of Example 11 was varied from 110 to 135 µm in step increments of about 3 µm/km, where dispersion values in Table 3 for Example 11 are averaged along the length of the fibers. The MFD at 1550 nm of Example 11 is 5.93 and 5.6 µm at the ends with glass diameters of 135 and 110 µm, respectively. Examples 9 and 11 had positive dispersion at 1550 nm, where Example 9 had a constant dispersion along the length of the fiber, and Example 11 had a decreasing dispersion along the length of the fiber. Example 10 was a dispersion shifted fiber with an absolute magnitude of dispersion at 1550 nm less than 3 ps/nm-km with a constant dispersion along the length of the fiber.

For the optical fiber of Example 11, the dispersion at 1550 nm varied by 4 ps/nm-km for the 25 µm variation in glass diameter (with constant core/clad diameter ratio and constant dopant concentrations along the length of the fiber). The dispersion slope was substantially constant at about 0.05 ps/nm$^2$-km. The fiber had a zero dispersion sensitivity of about ((4/0.05)/(25/125*100%))=80 nm/20%=4 nm/%.

Preferably, the optical fiber disclosed herein has: a MFD at 1550 nm of less than 7 µm, more preferably less than 6 µm; an attenuation at 1550 nm less than 0.5 dB/km, more preferably less than 0.4 dB/km, and a PMD of less than 0.1 ps/sqrt(km), more preferably less than 0.05 ps/sqrt(km). We have found that a central core segment having a majority (>50% of its radial extent) of its relative refractive index profile described by an α parameter, α1, of less than 2 yields low PMD values.

Table 4 lists the measured absolute SBS threshold of a 10 km section of Example 9 optical fiber, as well as the entire lengths of Examples 10 and 11.

TABLE 4

| Example: | | Ex 9 | Ex 10 | Ex 11 |
|---|---|---|---|---|
| Length | km | 10 | 10 | 13 |
| Attenuation at 1550 nm | dB/km | 0.381 | 0.428 | 0.458 |
| Measured absolute SBS threshold, Pth | dBm | 8.7 | 8.7 | 10.3 |
| A$_{eff}$ at 1550 nm | µm$^2$ | 19.45 | 20.9 | 27.6 |
| Absolute SBS threshold, normalized to 10 km and 0.5 dB/km, Pthn—10 | dBm | 8.57 | 8.87 | 11.23 |
| Absolute SBS threshold, normalized to 10 km and 0.5 dB/km, Pthn—10 | mW | 7.19 | 7.72 | 13.28 |
| Pthn—10/Aeff | mW/µm$^2$ | 0.37 | 0.37 | 0.48 |
| Absolute SBS threshold, normalized to 5 km and 0.5 dB/km, Pthn—5 | dBm | 10.7 | 11.0 | 13.4 |
| Absolute SBS threshold, normalized to 5 km and 0.5 dB/km, Pthn—5 | mW | 11.7 | 12.6 | 21.7 |
| Pthn—5/Aeff | mW/µm$^2$ | 0.60 | 0.60 | 0.79 |
| Absolute SBS threshold, normalized to 1 km and 0.5 dB/km, Pthn—1 | dBm | 16.9 | 17.2 | 19.6 |
| Absolute SBS threshold, normalized to 1 km and 0.5 dB/km, Pthn—1 | mW | 49.2 | 52.8 | 90.9 |
| Pthn—1/Aeff | mW/sq. microns | 2.53 | 2.53 | 3.29 |

With an increased SBS threshold and a decreased effective area, the optical fiber disclosed herein is more efficient at achieving nonlinear effects.

Preferably, the optical fiber disclosed herein has ratio of absolute threshold (in mW) divided by the effective area at 1550 nm of greater than 0.20 mW/µm$^2$, more preferably greater than 0.30 mW/µm$^2$, for fiber lengths greater than or equal to about 10 km.

Preferred embodiments of the optical fiber disclosed herein can thus be described as comprising: a fiber length, L, in km; a core having a centerline, an outer diameter $R_{CORE}$, and refractive index profile extending from the centerline to $R_{CORE}$; and a cladding layer surrounding and directly adjacent the core, the cladding layer having an outer diameter $R_{CLAD}$. The optical fiber has an attenuation at 1550 nm, α, in dB/km. The refractive index of the core is selected to provide: an optical effective area at 1550 nm less than about 30 µm$^2$; and an absolute SBS threshold in milliwatts greater than about $7.0+10 \log [(1-e^{-(0.5)(10)/4.343})/(1-e^{-(\alpha)(L)/4.343})]$.

Preferably, the refractive index profile is substantially uniform along the fiber length. Even more preferably, the core has a substantially uniform dopant concentration profile along the fiber length. Preferably, $R_{CORE}$ is substantially constant along the fiber length. Preferably, $R_{CLAD}$ is substantially constant along the fiber length. Preferably, the ratio of $R_{CORE}/R_{CLAD}$ is substantially constant along the fiber length.

In some preferred embodiments, the ratio of $R_{CORE}/R_{CLAD}$ is substantially constant along the fiber length, and wherein $R_{CLAD}$ varies by more than 5 µm along the fiber length.

In other preferred embodiments, the ratio of $R_{CORE}/R_{CLAD}$ is substantially constant along the fiber length, and $R_{CLAD}$ varies between 110 and 135 µm along the fiber length.

In some preferred embodiments, the ratio of $R_{CORE}/R_{CLAD}$ is substantially constant along the fiber length, and wherein $R_{CLAD}$ is varied at a rate of 3 µm/km along the fiber length.

In other preferred embodiments, $R_{CLAD}$ is between 124 and 126 µm along the fiber length.

Preferably, the core has a peak relative refractive index, $\Delta_{1A}$, and $\Delta_{1A}$ is substantially constant along the fiber length.

The core comprises one or more segments. In some preferred embodiments, the core consists of a single segment. In other preferred embodiments, the core comprises at least two segments. In still other preferred embodiments, the core comprises at least three segments.

The core comprises a central segment extending from the centerline to a radius $R_1$ between 2.5 and 5.0 µm. In some embodiments, the central segment extends from the centerline to a radius $R_1$ between 3.0 and 4.5 µm.

The central segment comprises a peak relative refractive index, $\Delta_{1A}$ between 1.5 and 2.5%. $\Delta_{1A}$ is disposed at a radius $R_{1A}$ less than 0.5 µm.

In some preferred embodiments, the central segment comprises a second peak relative refractive index, $\Delta_{1C}$, disposed at a radius $R_{1C}$ between 1.5 and 3.0 µm. Preferably, $\Delta_{1A} > \Delta_{1C}$. Preferably, the absolute magnitude of the difference between $\Delta_{1A}$ and $\Delta_{1C}$ is less than 0.3%. Preferably, the absolute magnitude of the difference between $\Delta_{1A}$ and $\Delta_{1C}$ is greater than 0.9%.

The refractive index of the core is selected to provide a mode field at 1550 nm of less than about 7 µm, preferably less than about 6 µm.

Other preferred embodiments of the optical fiber disclosed herein can also be described as comprising: a fiber length, L, in km; a core having a refractive index profile and a centerline; and a cladding layer surrounding and directly adjacent the core; wherein the optical fiber has an attenuation at 1550 nm, α, in dB/km; wherein L is at least 1 km; wherein α is less than 0.5 dB/km; and wherein the refractive index of the core is selected to provide: an optical effective area at 1550 nm, Aeff, less than about 30 µm²; and an absolute SBS threshold, Pth, in milliwatts; wherein Pth/Aeff, in milliwatts/µm², is greater than about 2.5.

Other preferred embodiments of the optical fiber disclosed herein can also be described as comprising: a fiber length, L, in km; a core having a refractive index profile and a centerline; and a cladding layer surrounding and directly adjacent the core; wherein the optical fiber has an attenuation at 1550 nm, α, in dB/km; wherein L is greater than 5 km; wherein α is less than 0.5 dB/km; wherein the refractive index of the core is selected to provide: an optical effective area at 1550 nm, Aeff, less than about 30 µm²; and an absolute SBS threshold, Pth, in milliwatts; wherein Pth/Aeff, in milliwatts/µm², is greater than about 0.5.

Other preferred embodiments of the optical fiber disclosed herein can also be described as comprising: a fiber length, L, in km; a core having a refractive index profile and a centerline; and a cladding layer surrounding and directly adjacent the core; wherein the optical fiber has an attenuation at 1550 nm, α, in dB/km; wherein L is greater than 10 km; wherein α is less than 0.5 dB/km; wherein the refractive index of the core is selected to provide: an optical effective area at 1550 nm, Aeff, less than about 30 µm²; and an absolute SBS threshold, Pth, in milliwatts; wherein Pth/Aeff, in milliwatts/µm², is greater than about 0.3.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band.

In one preferred embodiment, the system comprises a section of optical fiber as disclosed herein having a length of not more than 10 km. In another preferred embodiment, the system comprises a section of optical fiber as disclosed herein having a length of greater than 10 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

The optical fibers disclosed herein can be implemented in the dynamic dispersion compensation devices and methods described in International Patent Application Publication No. WO2004/073184.

Figure 14:
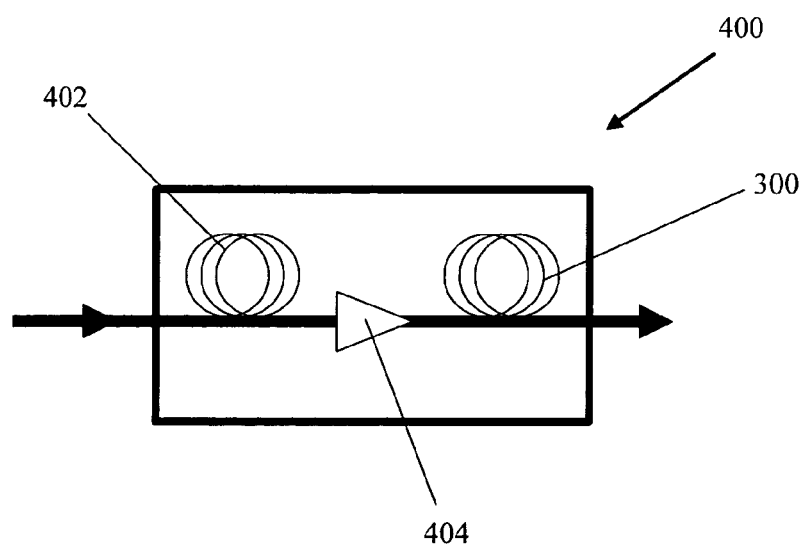
FIG. 14 is a simplified schematic illustration of a broadband dynamic dispersion compensation device, as disclosed herein.

FIG. 14 is a simplified schematic illustration of a broadband dynamic dispersion compensation device (DDCD) 400. The device comprises a negative dispersion optical fiber 402 which is optically connected to an optical amplifier 404, which is in turn optically connected to a positive dispersion nonlinear optical fiber 300, disclosed herein. Input signals are introduced into the device 400 and enter the negative dispersion fiber 402. The optical amplifier 404 has dynamic output power control. The negative dispersion fiber 402 has a length and dispersion sufficient to result in a negative residual dispersion for signals of each channel, e.g. each WDM channel, that exits the negative dispersion fiber 402, i.e. the negative dispersion fiber 402 pre-compensates the signals. In some preferred embodiments, the input signal power is low enough to keep nonlinear effects in the negative dispersion fiber 402 very low. The pre-compensated signals are then amplified and launched into the positive dispersion nonlinear fiber 300. The positive dispersion fiber 300 compensates the negative chirp introduced by the pre-compensation. The total length of the positive dispersion nonlinear fiber 300 is selected to ensure that pulses with the largest negative chirp at the input of the device 400, and therefore the largest negative chirp at the input of the positive dispersion nonlinear fiber 300, propagate a sufficient distance to balance the dispersion of the optical pulses of desired channels. The device 400 can serve as a dynamic dispersion compensator for multiple channels in a WDM system.

Figure 15:
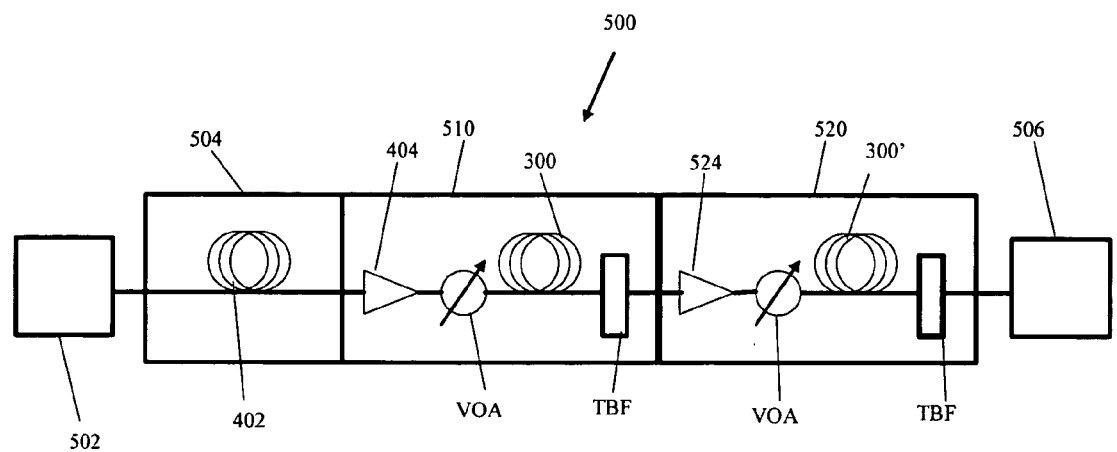
FIG. 15 is a schematic illustration of an embodiment of an optical communication system, as disclosed herein.

FIG. 15 schematically illustrates an embodiment of an optical communication system 500 comprising a transmitter 502, a DDCD 504, and a receiver 506 optically connected in series. The DDCD 504 comprises a negative dispersion fiber 402 for pre-compensation, an amplifier 404, and a positive dispersion nonlinear fiber 300, optically connected in series. The amplifier 404 and positive dispersion nonlinear fiber 300 make up a first stage 510. FIG. 15 also shows an optional second stage 520 comprising a second amplifier 524 and a second positive dispersion nonlinear fiber 300'. Each stage preferably further comprises a variable optical attenuator VOA optically connected between the amplifier and the positive dispersion nonlinear fiber. Each stage further preferably comprises a tunable bandpass filter TBF optically connected to the output end of the positive dispersion nonlinear fiber.

In preferred embodiments, the amplifier is an erbium-doped fiber amplifier (EDFA).

In one set of preferred embodiments, an optical communication system is disclosed herein comprising an optical fiber, as disclosed herein, having a dispersion at 1550 nm which varies substantially linearly from 10 ps/nm-km to 0.5 ps/nm-km over a 5 km optical fiber length, i.e. the fiber path length, wherein the system includes dynamic dispersion compensation of the optical signals transmitted therein. We have found that such optical fiber is useful for dynamic dispersion compensation.

Also disclosed herein is an optical communication system comprising an optical fiber adapted for 2R regeneration, the optical fiber comprising a plurality of fiber sections including at least one pair of fiber sections comprised of a first section directly adjacent to a second section, wherein the first section has a substantially constant dispersion at a selected wavelength across the length of the first section, for example at 1550 nm, and wherein the second section has a dispersion which varies exponentially with length at the selected wavelength across the length of the second section. Preferably the dispersion at the selected wavelength is positive for the first and second sections. In some preferred embodiments, the system comprises a plurality of pairs of fiber sections, wherein each pair comprises a first section having a substantially constant dispersion at the selected wavelength across the length of the first section, for example at 1550 nm, and a second section having a dispersion which varies exponentially with length at the selected wavelength across the length of the second section. Preferably, at least one pair of fiber sections comprises a first section having an optical fiber length at least two times greater than the optical fiber length of the second section of the respective pair, more preferably at least three times the optical fiber length of the second section of the respective pair. Preferably, at least one pair of fiber sections comprises a first section having a dispersion at the selected wavelength which is greater than 2 ps/nm-km, more preferably greater than 3 ps/nm-km, and a second section having a dispersion at the selected wavelength which is greater than 2 ps/nm-km, more preferably greater than 3 ps/nm-km. In some preferred embodiments, the system comprises a plurality of pairs of fiber sections, wherein the dispersion of each fiber section is preferably greater than 2 ps/nm-km, more preferably greater than 3 ps/nm-km. In other preferred embodiments, the system comprises a plurality of pairs of fiber sections, wherein the dispersion of each fiber section is preferably greater than 2 ps/mm-km and less than 11 ps/nm-km, more preferably greater than 3 ps/nm-km and less than 10 ps/nm-km.

In a set of preferred embodiments, an optical communication system comprises a plurality of fiber sections including at least one pair of fiber sections comprised of a first section directly adjacent to a second section, wherein the first section has a substantially constant dispersion of between 7 and 10 ps/nm-km at a selected wavelength of 1550 nm, and wherein the second section has a dispersion which varies exponentially with length at the selected wavelength across the length of the second section, wherein the dispersion of the second section is between 2 and 10 ps/nm-km. In one embodiment, the dispersion at 1550 nm of the first section is between 7 and 10 ps/nm-km, more preferably between 8 and 9 ps/nm-km, and even more preferably between 8.2 and 8.6 ps/nm-km, and the second section has a dispersion at 1550 nm with a minimum of between 2 and 5 ps/nm-km, preferably between 2 and 4 ps/nm-km, more preferably between 2 and 3.5 ps/nm-km. The first section preferably has an optical fiber length of at least 2 km, preferably between 2 and 4 km, and the second section preferably has an optical fiber length of less than 2 km, preferably between 0.5 and 1.5 km.

In some preferred embodiments, the first and second fiber sections of a pair of fiber sections is a unitary fiber produced from a single continuous fiber draw operation. In other preferred embodiments, the first and second fiber sections of a pair of fiber sections are made by joining and/or splicing two separate fibers produced from different fiber draws. A fiber section may be comprised of a plurality of fiber sub-sections; for example, a second section with dispersion that varies exponentially with fiber length can be comprised of a plurality of smaller sub-sections with dispersions that vary linearly with fiber length and which are arranged to yield dispersion which varies substantially or approximately exponentially with fiber length.

One or more other fiber sections, which do not form a pair, may be optically connected to the at least one pair of optical fiber sections.

Pairs of optical fiber sections are preferably directly adjacent to each other.

Also disclosed herein is a 2R regenerator device comprising at least pair of optical fiber sections as described above.

Figure 16:
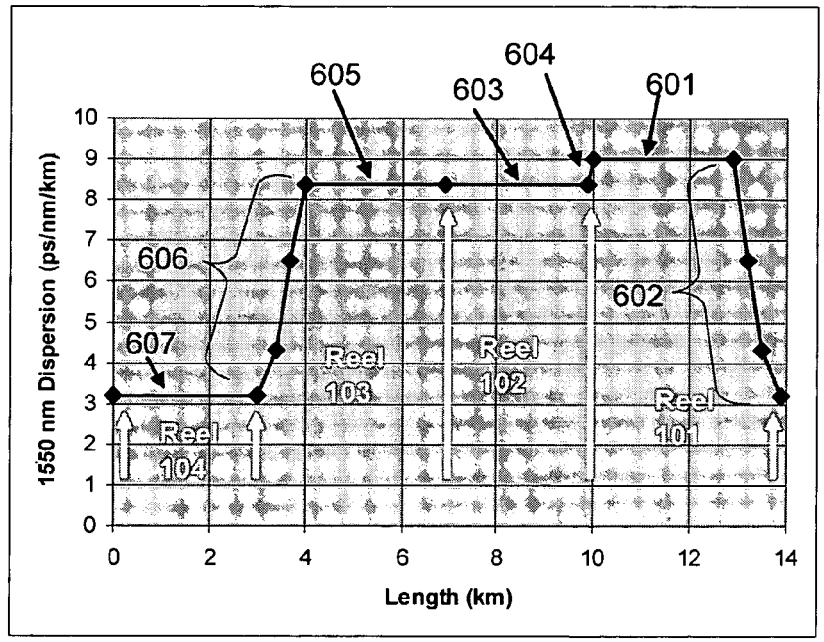
FIG. 16 is a schematic illustration of the dispersion at 1550 nm versus optical fiber length for a preferred embodiment of an optical fiber comprised of two or more nonlinear optical fiber sections as disclosed herein.

FIG. 16 schematically illustrates the dispersion at 1550 nm versus optical fiber length for an Example of one preferred embodiment of plurality of optical fiber sections suitable for 2R applications. A first pair of optical fiber sections on a first reel 101 of optical fiber comprises a first optical fiber section 601 having a dispersion of about 9 ps/nm-km and a length of about 3 km, and a second optical fiber section 602 having a dispersion that decreases from about 9 ps/nm-km to about 3.2 ps/nm-km over a length of about 1 km. A second pair of optical fiber sections is provided by a first optical fiber section 603 on a second reel 102 of optical fiber and having a dispersion of about 8.4 ps/nm-km and a length of about 3 km, and a second optical fiber section 604 on the first reel 101 and having a dispersion that increases from about 8.4 ps/nm-km to about 9 ps/nm-km over a length of about 0.2 km. A third pair of optical fiber sections on a third reel 103 of optical fiber comprises a first optical fiber section 605 having a dispersion of about 8.4 ps/nm-km and a length of about 3 km, and a second optical fiber section 606 having a dispersion that increases from about 3.2 ps/nm-km to about 8.4 ps/nm-km over a length of about 1 km. The first section 601 of the first pair of fiber sections on reel 101 is optically coupled to the second section 604 of the second pair of fiber sections on reel 102. The first section 603 of the second pair of fiber sections on reel 102 is optically coupled to the first section 605 of the third reel 103. A fourth reel 104 of optical fiber 607 having a substantially constant dispersion at 1550 nm of about 3.2 ps/nm-km and an optical fiber length of about 3 km is optically coupled to the second section 606 of the third pair of fiber sections of reel 103. Alternatively, the optical fiber 607 of the fourth reel 104 and the second fiber section 606 of reel 103 may be considered to constitute a pair of fiber sections as disclosed herein, and so forth.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
    a fiber length, L, in km;
    a core having a centerline, an outer diameter $R_{CORE}$, and refractive index profile extending from the centerline to $R_{CORE}$; and
    a cladding layer surrounding and directly adjacent the core, the cladding layer having an outer diameter $R_{CLAD}$;
    wherein the optical fiber has an attenuation at 1550 nm, $\alpha$, in dB/km;
    wherein the refractive index of the core is selected to provide:
    an optical effective area at 1550 nm less than about 30 $\mu m^2$; and
    an absolute SBS threshold in milliwatts greater than about $7.0 + 10 \log [(1-e^{-(0.5)(10)/4.343})/(1-e^{-(\alpha)(L)/4.343})]$.

2. The optical fiber of claim 1 wherein the refractive index profile is substantially uniform along the fiber length.

3. The optical fiber of claim 1 wherein the core has a substantially uniform dopant concentration profile along the fiber length.

4. The optical fiber of claim 1 wherein the ratio of $R_{CORE}/R_{CLAD}$ is substantially constant along the fiber length.

5. The optical fiber of claim 1 wherein the ratio of $R_{CORE}/R_{CLAD}$ is substantially constant along the fiber length, and wherein $R_{CLAD}$ varies by more than 5 $\mu$m along the fiber length.

6. The optical fiber of claim 1 wherein the ratio of $R_{CORE}/R_{CLAD}$ is substantially constant along the fiber length, and wherein $R_{CLAD}$ varies between 110 and 135 $\mu$m along the fiber length.

7. The optical fiber of claim 1 wherein the ratio of $R_{CORE}/R_{CLAD}$ is substantially constant along the fiber length, and wherein $R_{CLAD}$ is varied at a rate of about 3 $\mu$m/km along the fiber length.

8. The optical fiber of claim 1 wherein $R_{CLAD}$ is between 124 and 126 $\mu$m along the fiber length.

9. The optical fiber of claim 1 wherein the core comprises a central segment extending from the centerline to a radius $R_1$ between 2.5 and 5.0 $\mu$m.

10. The optical fiber of claim 9 wherein the central segment comprises a peak relative refractive index, $\Delta_{1A}$ between 1.5 and 2.5%.

11. The optical fiber of claim 9 wherein the central segment comprises a second peak relative refractive index, $\Delta_{1C}$, disposed at a radius $R_{1C}$ between 1.5 and 3.0 $\mu$m.

12. The optical fiber of claim 11 wherein $\Delta_{1C}$ is between 0.5 and 2%.

13. The optical fiber of claim 11 wherein the core comprises a minimum relative refractive index, $\Delta_{1B}$ disposed at a radius $R_{1B}$ located between $R_{1A}$ and $R_{1C}$, wherein $\Delta_{1B}$ is between 0.5 and 1%.

14. The optical fiber of claim 1 wherein the core further comprises a second segment extending from $R_1$ to a radius, $R_2$, and comprising a minimum relative refractive index, $\Delta_{MIN}$, between −0.01% and −0.5%, wherein the second segment has a width, $w_2$, between 2 and 5 $\mu$m, and wherein the second segment has a midpoint, $R_{2MID}$, between 5 and 7 $\mu$m.

15. The optical fiber of claim 1 wherein the refractive index of the core is selected to provide a mode field at 1550 nm of less than about 6 $\mu$m.

16. An optical transmission system comprising a transmitter for sending optical signals at a selected wavelength, a receiver for receiving the optical signals, and the optical fiber of claim 1, wherein the optical fiber optically connects the transmitter and receiver, and wherein the optical fiber has a fiber length and a dispersion at the selected wavelength, wherein the dispersion varies linearly with fiber length.

17. An optical transmission system comprising a transmitter for sending optical signals at a selected wavelength, a receiver for receiving the optical signals, and the optical fiber of claim 1, wherein the optical fiber optically connects the transmitter and receiver, and wherein the optical fiber has a fiber length and a dispersion at the selected wavelength, wherein the dispersion varies exponentially with fiber length.

18. An optical fiber comprising:
    a fiber length, L, in km;
    a core having a refractive index profile and a centerline; and
    a cladding layer surrounding and directly adjacent the core;
    wherein the optical fiber has an attenuation at 1550 nm, $\alpha$, in dB/km;
    wherein L is greater than 1 km;
    wherein $\alpha$ is less than 0.5 dB/km;
    wherein the refractive index of the core is selected to provide;
    an optical effective area at 1550 nm, Aeff, less than about 30 $\mu m^2$; and
    an absolute SBS threshold, Pth, in milliwatts;
    wherein Pth/Aeff, in milliwatts/$\mu m^2$, is greater than about 2.5.

* * * * *